United States Patent
Yu et al.

(10) Patent No.: US 10,936,663 B2
(45) Date of Patent: Mar. 2, 2021

(54) GENERATING SENSITIVE DIALOGUE THROUGH LIGHTWEIGHT SIMULATION

(71) Applicant: Robert Bosch GmbH, Stuttgart (DE)

(72) Inventors: Lixiu Yu, Pittsburgh, PA (US); Alessandro Oltramari, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 16/209,000

(22) Filed: Dec. 4, 2018

(65) Prior Publication Data

US 2019/0197059 A1 Jun. 27, 2019

Related U.S. Application Data

(60) Provisional application No. 62/609,208, filed on Dec. 21, 2017.

(51) Int. Cl.
| | |
|---|---|
| *G06F 16/9032* | (2019.01) |
| *G06F 40/00* | (2020.01) |
| *H04W 4/029* | (2018.01) |
| *G06K 9/62* | (2006.01) |
| *G10L 15/06* | (2013.01) |
| *H04M 3/51* | (2006.01) |

(52) U.S. Cl.
CPC ........ *G06F 16/90332* (2019.01); *G06F 40/00* (2020.01); *G06K 9/6262* (2013.01); *G10L 15/063* (2013.01); *H04M 3/5116* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 2011/0064205 A1* | 3/2011 | Boni | H04M 11/04 379/45 |
| 2014/0211927 A1* | 7/2014 | Clawson | H04M 3/493 379/45 |
| 2014/0370841 A1* | 12/2014 | Roberts | H04M 1/72536 455/404.2 |
| 2016/0088455 A1* | 3/2016 | Bozik | H04W 4/90 370/225 |
| 2017/0150335 A1* | 5/2017 | Self | H04M 3/42357 |

(Continued)

*Primary Examiner* — Antim G Shah
(74) *Attorney, Agent, or Firm* — Maginot, Moore & Beck LLP (57) ABSTRACT

A crowdsourced dialogue system includes a first and second computer system, a training system, and an automated response system. The first computer system includes a caller interface operated by a non-expert user and to generate caller dialogue data based on inputs to the first computer system from the non-expert user. The second computer system includes an expert interface operated by an expert user and to generate expert dialogue data based on inputs to the second computer system from the expert user. The training system includes a general domain dialogue database. The training system is configured to generate a domain-specific dialogue database based on the caller dialogue data and the expert dialogue data. The automated response system includes a chatbot that is trained with the general domain dialogue database and the domain-specific dialogue database to generate natural language dialogue data at least in a domain of the domain-specific dialogue database.

13 Claims, 8 Drawing Sheets

(56) References Cited

U.S. PATENT DOCUMENTS

2017/0213157 A1    7/2017  Bugay et al.
2018/0012232 A1*  1/2018  Sehrawat ................ G06F 21/31
2019/0174289 A1*  6/2019  Martin ................ H04M 3/5116

* cited by examiner

GENERATING SENSITIVE DIALOGUE THROUGH LIGHTWEIGHT SIMULATION

This application claims the benefit of priority of U.S. provisional application Ser. No. 62/609,208, filed on Dec. 21, 2017, the disclosure of which is herein incorporated by reference in its entirety.

FIELD

The following disclosure relates to the field of automated dialogue generation and, in particular, to a crowdsourced approach for building a database of sensitive dialogue for training an artificially intelligent chatbot.

BACKGROUND

Conversational agents, more commonly referred to as chatbots, have become increasingly popular in a variety of domains. Major technology companies are competing with each other to build the most effective chatbot frameworks. For example, Amazon Alexa can perform simple tasks such as playing music and creating to-do lists, and Apple Siri can keep up basic conversations with users.

To sustain an intelligent conversation, chatbots need to understand users' inputs, interact with users naturally, and execute tasks successfully and in a timely manner. To achieve human-level conversational capability, one fundamental requirement is that chatbots be trained with a large amount of high-quality dialogue data. These dialogue data are usually composed of natural dialogues between humans. For example, Cleverbot from Google used 1.4 billion conversational interactions for chatbot training.

Natural dialogues are especially relevant when building a chatbot for a particular domain that requires conversations on specific topics reflecting context-dependent dialogue patterns and background knowledge. Without sufficient training datasets, a chatbot cannot be trained to respond properly to users. However, large domain-specific dialogue datasets are often unavailable, due to the private or sensitive nature of the dialogue content. For instance, there are very limited sources of emergency dispatch dialogues, because the private information mentioned in 911 calls prohibits governments from sharing the dialogue data with a third party. Lacking authentic emergency dialogues becomes a bottleneck for building robust chatbot systems in the emergency domain, which would potentially be very useful in supporting dispatchers and first responders.

Accordingly, further advancements in the area of chatbots configured to generate dialogue in sensitive and/or emergency domains are desired.

SUMMARY

According to an exemplary embodiment of the disclosure, a crowdsourced dialogue system includes a first computer system, a second computer system, a training system, and an automated response system. The first computer system is communicatively connected to the Internet and includes a caller interface configured to be operated by a non-expert user and to generate caller dialogue data based on inputs to the first computer system from the non-expert user. The second computer system is communicatively connected to the Internet and includes an expert interface configured to be operated by an expert user and to generate expert dialogue data based on inputs to the second computer system from the expert user. The training system is communicatively connected to the Internet and includes a general domain dialogue database. The training system is configured to generate a domain-specific dialogue database based on the caller dialogue data and the expert dialogue data. The automated response system is communicatively connected to the Internet and includes a chatbot that is trained with the general domain dialogue database and the domain-specific dialogue database to generate natural language dialogue data at least in a domain of the domain-specific dialogue database.

According to another exemplary embodiment of the disclosure a method of training and operating an automated emergency response system to provide emergency services includes generating caller dialogue data from a non-expert user of a caller interface displayed by a first computer system, and generating expert dialogue data from an expert user of an expert interface displayed by a second computer system. The method further includes generating a domain-specific dialogue database based on the caller dialogue data and the expert dialogue data, and training a domain-specific natural language chatbot of the automated emergency response system with the domain-specific dialogue database. The claimed method also includes operating the domain-specific natural language chatbot to elicit emergency data from a user of the automated emergency response system, and providing emergency services to the user of the automated emergency response system based on the elicited emergency data.

BRIEF DESCRIPTION OF THE FIGURES

The above-described features and advantages, as well as others, should become more readily apparent to those of ordinary skill in the art by reference to the following detailed description and the accompanying figures in which.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

Figure 1:
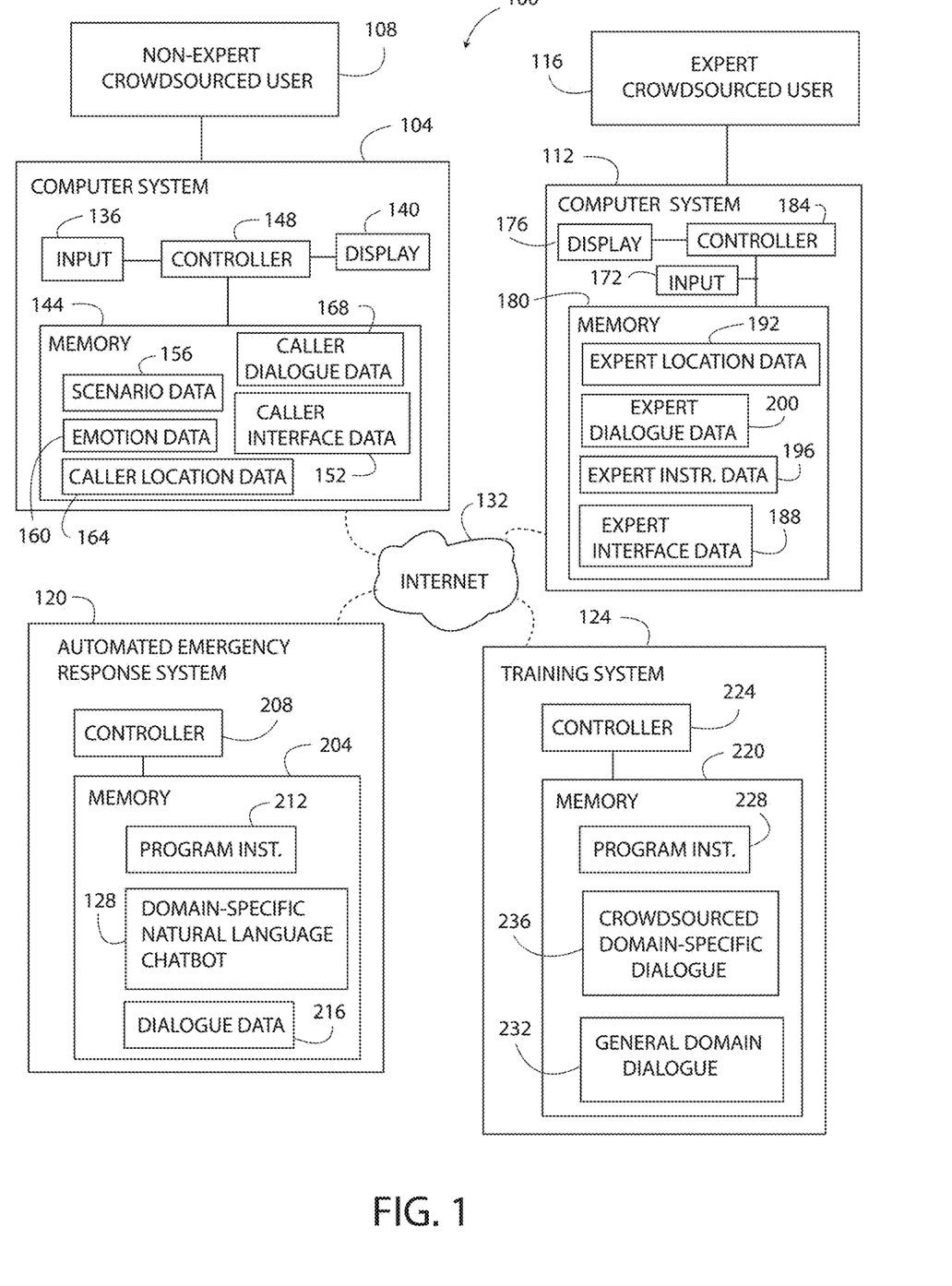
FIG. 1 is a block diagram of a crowdsourced dialogue system including two computer systems, a training system, and an automated emergency response system.

As shown in FIG. 1 a crowdsourced dialogue system 100 includes a non-expert first computer system 104 used by a non-expert crowdsource user 108, an expert second computer system 112 used by an expert crowdsourced user 116, an automated emergency response system 120, and a training system 124 configured to train the automated emergency response system 120. In a training mode, the system 100 is configured to simulate real-world scenarios, in which the expert-crowdsource users 116 and the non-expert crowdsource users 108 have different roles and generate corresponding dialogues, which are transmitted to and stored by the training system 124 and used to train a machine learning domain-specific natural language intelligent chatbot 128 of the automated emergency response system 120. As set forth below, the crowdsourced approach in training the chatbot 128 overcomes privacy concerns associated with actual emergency call data and generates high-quality emergency dialogues making the automated emergency response system 120 a very effective solution for meeting the demands of a modern 911 communication system.

As an introduction, consider that large domain-specific datasets are typically used to build and/or to train intelligent chatbots, but that such datasets are not always available, especially when the datasets contain private or sensitive information. Such is typically the case in the emergency services domain, in which the content is emergency calls and the emergency call data are protected by privacy rules. Moreover, a common dialogue collection system is insufficient to generate a dataset for domain-specific topics, such as emergency services.

Researchers have explored virtual games and different crowdsourcing approaches to generate the datasets for domain-specific natural dialogues. By using these virtual games, researchers were able to generate diverse and natural conversations, but the process was too expensive and time-consuming to be commercially successful. With regard to the crowdsourcing approach, researchers developed dialogue platforms enabling crowdworkers to generate dialogues according to a given dialogue scenario or template. However, these past crowdsourcing approaches are not a viable solution for more complex domain settings like emergency services, because emergency service dialogues have their own characteristics: it is a sense-making process for the dispatcher, it conveys a sense of urgency, and every emergency situation is different. Emergency dialogues are most optimally generated by putting people into simulated emergency situations, with some of the people having the knowledge of the domain.

The crowdsourced dialogue system 100, disclosed herein, solves these problems of past devices and of past approaches for generating a domain-specific dialogue dataset/database using a crowdsourcing approach. Specifically, the system 100 simulates real-world scenarios and emergencies as a virtual game does, but remains lightweight from a computational standpoint. As described in detail below, the system 100 uses a text-based interface according to a Wizard of Oz approach, and applies this interface to the context of generating dialogue in a selected domain, such as the domain of emergency services. The system 100 supports text-based conversations between an emergency services dispatcher (i.e. the expert user 116) and an emergency caller (i.e. the non-expert user 108) and includes three main design features. First, the system 100 creates realism. To make the conversations realistic, the system 100 establishes at least location realism and emotional realism, both of which are described herein. Second, the system 100 enables the expert users 116 to lead and to guide the non-expert users 108 (also referred to herein as "unskilled users"). Conversations during emergency calls are more realistic when a party possesses professional knowledge, as do the expert users 116. Third, the system 100 is trained with a machine learning framework. In one embodiment, the workflow and incentive design of the system 100 are inspired and modeled according to the Generative Adversarial Network ("GAN") framework. That is, there are two groups of crowd workers: the first group is incentivized to generate authentic dialogues that fool the second group who is, conversely, incentivized to recognize the simulated ones.

Based on the above, the system 100 is an optimally configured crowdsourcing system that accurately simulates privacy-preserving domain scenarios and generates natural dialogues. The system 100 includes lightweight features to achieve realism in a crowdsourced simulation. The system 100 uses crowdsourcing to generate high-quality emergency dialogues, which are critical to developing and training the intelligent chatbot 128. Each element of the system 100 is described herein.

With reference again to FIG. 1, in one embodiment, the non-expert computer system 104 is a desktop computer that is communicatively connected to the Internet 132. The non-expert computer system 104 includes an input 136, a display 140, and a memory 144 each operatively connected to a controller 148. The input 136 includes at least one of a keyboard, a mouse, and a microphone, for example, for receiving inputs from the non-expert user 108. The display 140 is configured to display information to the non-expert user 108.

The memory 144 is an electronic data storage unit, which is also referred to herein as a non-transient computer-readable medium and includes caller interface data 152, scenario data 156, emotion data 160, caller location data 164, and caller dialogue data 168. The computer system 104 is configured to display the caller interface data 152, the scenario data 156, the emotion data 160, and the caller location data 164 on the display 140 as part of a dialogue generating communication session (i.e. a simulated emergency call or a simulated call, depending on the domain) with an expert user 116. (See FIG. 2). The caller interface data 152, when displayed on the display 140, creates an immersive situation in which the user 108 is prompted to generate domain-specific dialogue. The inputs 136 receive the text-based or spoken domain-specific dialogue generated by the user 108, and the computer system 104 stores the dialogue from the user as the caller dialogue data 168. The caller dialogue data 168 is natural language dialogue that is generated by the non-expert user 108 during a simulated emergency call with the expert user 116, according to a process described herein. The controller 148 is configured as a microprocessor, a processor, or any other type of electronic control chip. In another embodiment, the non-expert computer system 104 is a smartphone, tablet computer, or any other such device that is configured to receive text-based user inputs and to display visual information to the user 108.

The non-expert crowdsource user 108, in one embodiment, is a user of the non-expert computer system 104 that is a non-expert or is "unskilled" in the domain of the chatbot 128. For example, an exemplary non-expert crowdsource user 108 is an electrician and the domain of the chatbot 128 is emergency services. The non-expert crowdsource user 108 is "skilled" in the area of his/her trade, but is unskilled or a non-expert in the area of emergency services, as are most people that use utilize emergency service systems. The system 100 is shown as including one non-expert crowdsource user 108 and one non-expert computer system 104, but, in other embodiments, the system 100 includes a plurality of users 108 and computer systems 104, such as from one to ten thousand, for example.

As shown in FIG. 1, in one embodiment, the expert computer system 112 is a desktop computer that is communicatively connected to the Internet 132. The expert computer system 112 includes an input 172, a display 176, and a memory 180 each operatively connected to a controller 184. The input 172 includes at least one of a keyboard, a mouse, and a microphone, for example, for receiving inputs from the expert user 116. The display 176 is configured to display information to the expert user 116.

The memory 180 is an electronic data storage unit, which is also referred to herein as a non-transient computer-readable medium and includes expert interface data 188, expert location data 192, expert instruction data 196, and expert dialogue data 200. The computer system 104 is configured to display the expert interface data 188, the expert location data 192, and the expert instruction data 196 on the display 176 as part of a dialogue generating communication session (i.e. the simulated emergency call) with a non-expert user 108. The expert interface data 188, when displayed on the display 176, creates an immersive situation in which the user 116 is prompted to generate domain-specific dialogue. The inputs 172 receive the text-based or spoken domain-specific dialogue generated by the user 116, and the computer system 112 stores the dialogue from the user 116 as the expert dialogue data 200. The expert dialogue data 200 is natural language dialogue that is generated by the expert user 116 during the simulated emergency call with the non-expert user 108, according to a process described herein. The controller 184 is configured as a microprocessor, a processor, or any other type of electronic control chip. In another embodiment, the expert computer system 112 is a smartphone, tablet computer, or any other such device that is configured to receive text-based user inputs and to display visual information to the user 116.

The expert crowdsource user 116, in one embodiment, is a user of the expert computer system 112 that is an expert or is skilled in the domain of the chatbot 128. For example, an exemplary expert crowdsource user is a current or previous 911 dispatch operator (i.e. an emergency services dispatcher) and the domain of the chatbot 128 is emergency services. The expert crowdsource user 116 is skilled in generating spoken and text-based dialogue pertaining to the domain of the chatbot 128. The system 100 is shown as including one expert crowdsource user 116 and one expert computer system 112, but, in other embodiments, the system 100 includes a plurality of users 116 and computer systems 112, such as from one to ten thousand, for example. Moreover, in another embodiment, the expert user 116 has received special instructions in the domain of the chatbot 128 that the non-expert user 108 has not received, but the expert user 116 is not a professional and/or is not employed (past or present) in the domain of the chatbot 128.

With continued reference to FIG. 1, the automated emergency response system 120, which is also referred to herein as an automated response system and a response system, is communicatively connected to the Internet 132. The response system 120 includes a memory 204 operably connected to a controller 208. The memory 204 is an electronic data storage unit, which is also referred to herein as a non-transient computer-readable medium. The memory 204 is configured to store program instructions 212 for operating the response system 120, the domain-specific natural language intelligent chatbot 128, and dialogue data 216. The dialogue data 216 corresponds to intelligent dialogue automatically generated by the chatbot 128. The controller 208 is configured as a microprocessor, a processor, or any other type of electronic control chip. The response system 120 is shown in FIG. 1, in a "training" configuration in which the chatbot 128 is configured to be trained by the training system 124, according to a process described below.

The chatbot 128 is a computer program configured to conduct a "conversation" with a user using text-based or audio-based language inputs and outputs. That is, in response to a natural language input, the chatbot 128 generates a contextually accurate natural language response that, for example, answers a question, asks a question, provides instructions, and the like. Thus, the chatbot 128 interacts with a user in the same way as a real person. The chatbot 128, in one embodiment, is an artificial intelligence that includes a neural network.

The training system 124 is communicatively connected to the Internet 132 and includes a memory 220 operably connected to a controller 224. The memory 220 is an electronic data storage unit, which is also referred to herein as a non-transient computer-readable medium. The memory 220 is configured to store program instructions 228 for operating the training system 124, a general domain dialogue database 232, and a crowdsourced domain-specific dialogue database 236. The general domain dialogue database 232 includes data corresponding to the dialogue of a general domain, as would be used in everyday conversation between two average people, for example. The domain of the domain-specific dialogue database 236 is the same as the domain of the chatbot 128, such as the emergency services domain. Accordingly, in one embodiment, the domain-specific dialogue database 236 includes data corresponding to the dialogue used between an emergency services dispatcher and a person seeking emergency services. The training system 124 is configured to generate the domain-specific dialogue database 236 based on the caller dialogue data 168 and the expert dialogue data 200. The controller 224 is configured as a microprocessor, a processor, or any other type of electronic control chip.

In one embodiment, the training system 124 trains the chatbot 128 with the general domain dialogue database 232 and the domain-specific dialogue database 236 to configure the chatbot 128 to generate natural language dialogue data 216 at least in the domain of the domain-specific dialogue database 236 in response to a natural language input. In another embodiment, the chatbot 128 is trained with only the domain-specific dialogue database 236 to configure the chatbot 128 to generate the natural language dialogue data 216 at least in the domain of the domain-specific dialogue database 236 in response to a natural language input. The neural network of the chatbot 128 is trained with deep learning using at least one of the databases 232, 236 to configure the chatbot 128 to have a sophisticated natural language processing system and to interact with a user in the same way as a real person would in conducting a conversation. For example, the chatbot 128 employs a sequence to sequence model of deep learning.

Figure 2:
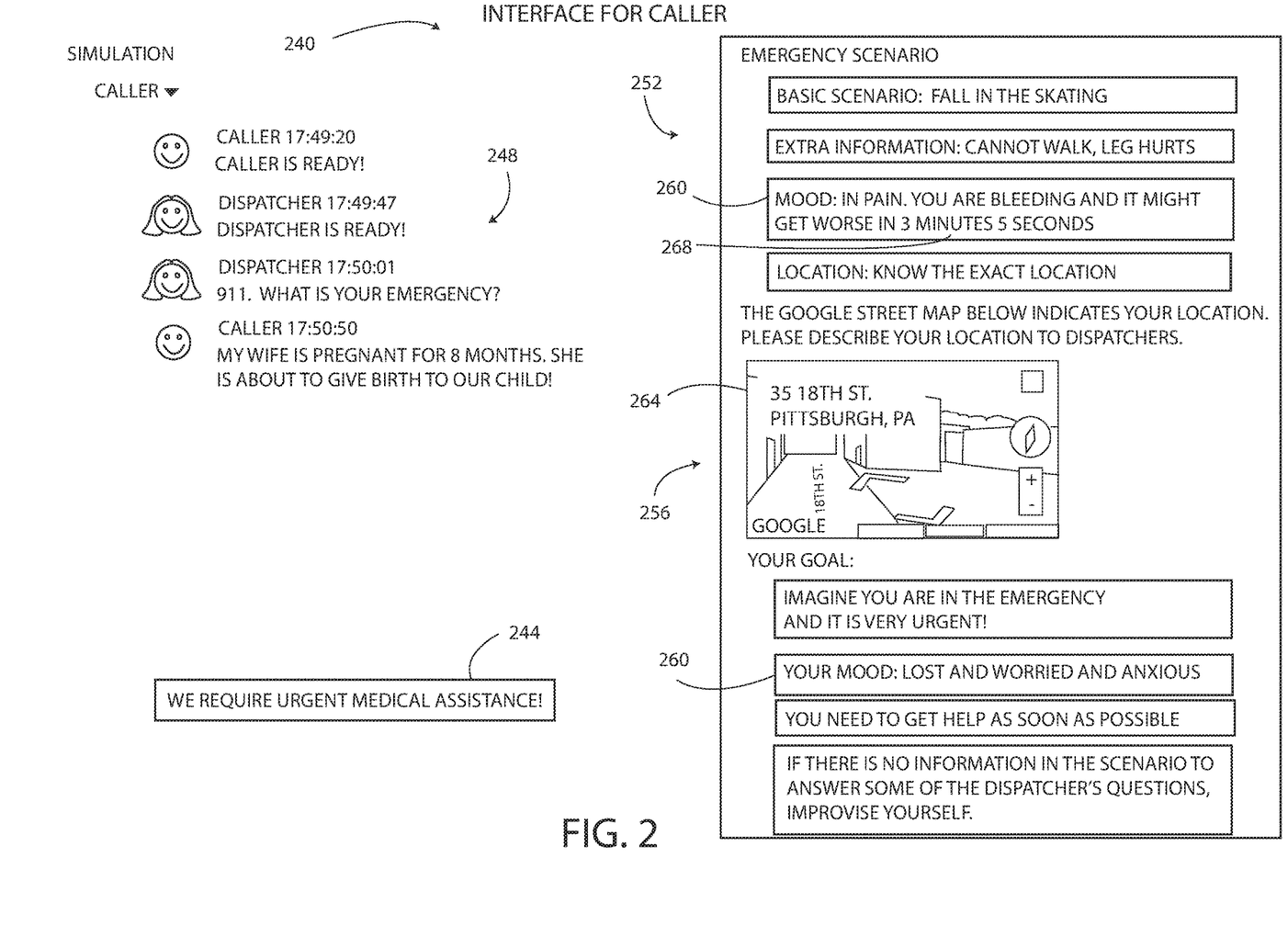
FIG. 2 is a diagram of a graphical user interface provided to a non-expert user of the crowdsourced dialogue system of FIG. 1.

As shown in FIG. 2, during a simulated emergency call between the non-expert user 108 and the expert user 116, the non-expert user 108 of the computer system 104 is shown a caller interface 240 on the display 140, which is based on the caller interface data 152. The caller interface 240 is configured to be operated by the non-expert user 108 and to generate the caller dialogue data 168 based on inputs to the computer system 104 from the non-expert user 108. The caller interface 240 includes an input text box 244, a conversation history area 248, a scenario area 252, a location area 256, and an emotion area 260. The input text box 244 is configured receive and to display the caller dialogue data 168 from the non-expert user 108 via the input 136 of the computer system 104. The conversation history area 248 displays the caller dialogue data 168 and the expert dialogue data 200 that was generated during the simulated emergency call. As a result, the caller dialogue data 168 is based on at least the expert dialogue data 200, the scenario data 156, the emotion data 160, and the caller location data 164.

The scenario area 252 displays data based on the scenario data 156, which in one embodiment describes a scenario in the domain of the domain-specific dialogue database 236. The domain, in one embodiment, includes providing emergency services during an emergency. For example, the scenario area 252 displays information to the non-expert user 108 regarding a scenario that would typically prompt a person to call emergency services. In an example, the scenario area 252 displays text indicating that a person has fallen down while ice skating and is injured. The scenario area 252 also includes text indicating that the injured person has hurt their leg and cannot walk. Moreover, the scenario area 252 may include goals or objectives for the non-expert user 108 to accomplish during the simulated emergency call, such as getting help for the injured person as soon as possible.

The scenario area 252, in one embodiment, does not contain all the information about the exemplary emergency situation. Instead, the non-expert user 108 improvises information based on the scenario data 252, the location data 164, and the emotion data 160, and provides improvised details of the "emergency" to the expert user 116. This approach generates diverse caller dialogue data 168 and expert dialogue data 200 even when different users 108, 116 use the same general scenario.

The location area 256 displays data based on the location data 164. For example, the location area 256 may include a street-side image 264 of a specific geographical location of an accident or incident that requires emergency services. The street-side image 264 is stored as part of the caller location data 164. The location area 256 may also include text indicating to the user 108 that the exact location of the accident or incident is known in a particular scenario used during a simulated emergency call. The location area 256 may include any other information related to the location of an event that is the subject of the scenario data 156.

The emotion area 260 (also referred to herein as a mood area) displays data based on the emotions or mood that should be exhibited by the user 108 during the simulated emergency call. For example, the emotion area 260 may include text indicating that the injured party is in severe pain and is bleeding. Moreover, the emotion area 260 may include text indicating that the non-expert user 108 should act at least one of anxious, sad, scared, worried, tired, concerned, lost, confused, and the like. The emotion area 260 may include text indicating that the non-expert user 108 should have any corresponding emotion or condition that is typically exhibited by people phoning emergency services.

In one embodiment, the emotion area 260 includes a timer 268 that counts down from a predetermined time period, such as five minutes. As described below, the timer 268 elicits a sense of urgency and anxiety in the non-expert user 108. Moreover, in one embodiment, the simulated emergency call between the non-expert user 108 and the expert user 116 is terminated at an expiration of the predetermined time period. Knowing that the simulated emergency call will be terminated at the end of the predetermined time period elicits the urgency and anxiety from the non-expert user 108.

Figure 3:
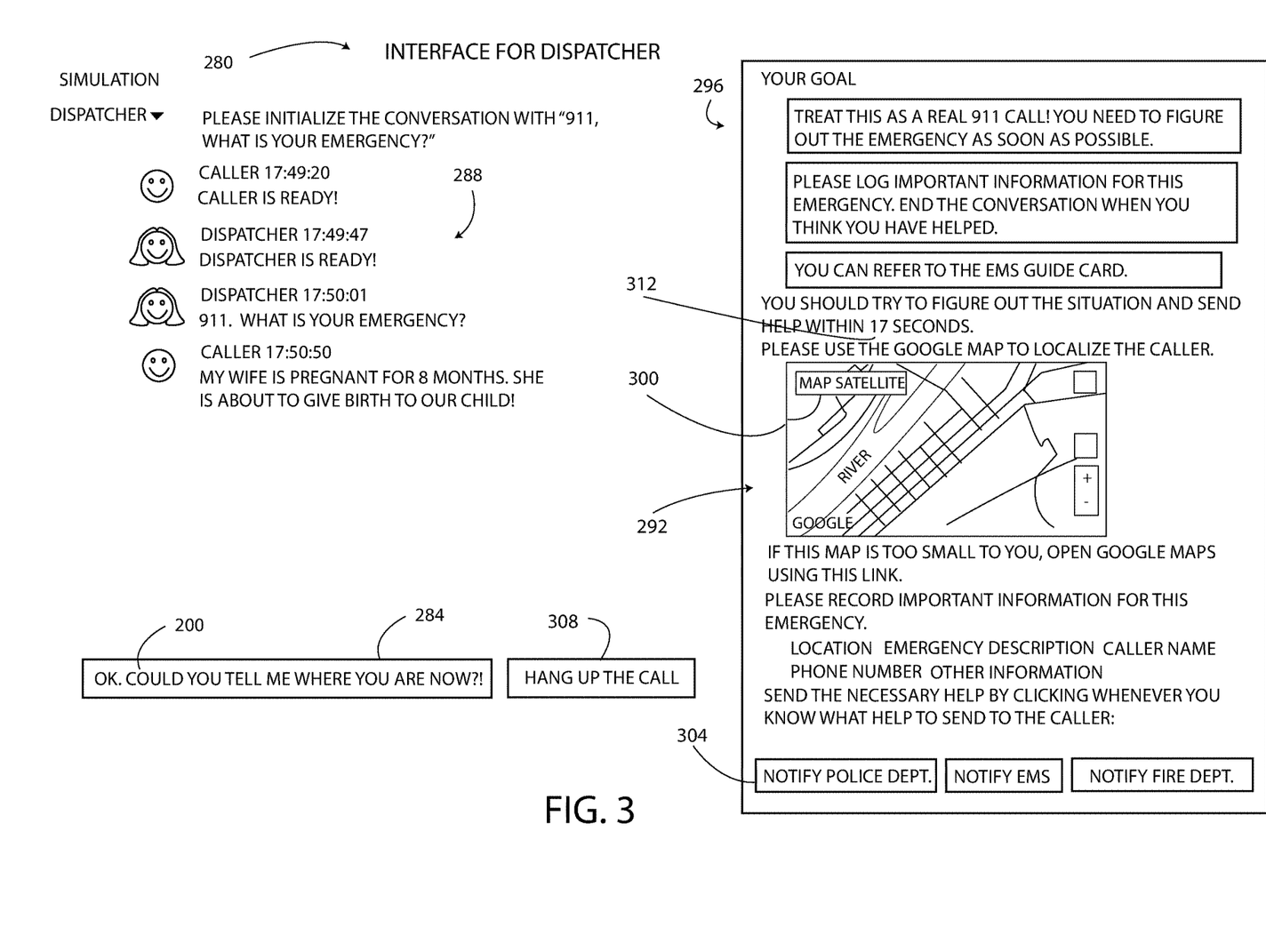
FIG. 3 is a diagram of a graphical user interface provided to an expert user of the crowdsourced dialogue system of FIG. 1.

With reference to FIG. 3, during the simulated emergency call between the non-expert user 108 and the expert user 116, the expert user 116 of the computer system 112 is shown an expert interface 280 on the display 176, which is based on the expert interface data 188. The expert interface 280 is configured to be operated by the expert user 116 and to generate the expert dialogue data 200 based on inputs to the computer system 112 from the expert user 116. The expert interface 280 is configured to display the expert instruction data 196 to the expert user 116. To this end, the expert interface 280 includes an input text box 284, a conversation history area 288, a location area 292, and an instruction area 296. The input text box 284 is configured receive and to display the expert dialogue data 200 from the expert user 116 via the input 172 of the computer system 112. The conversation history area 288 displays the expert dialogue data 200 and the caller dialogue data 168 that is generated during the simulated emergency call.

The location area 292 of the expert interface 240 displays data based on the expert location data 192. For example, the location area 292 may include a portion of a map 300 corresponding to a location of an accident or incident that requires emergency services. Typically, the caller location data 164 corresponds to a specific geographical location, and the expert location data 192 corresponds to a general geographical location that is broader than the specific geographical location. This requires the expert user 116 to figure out the specific geographical location during the simulated emergency call based on the caller dialogue data 168. The location area 292 may include any other information related to the location of an event that is the subject of the simulated emergency call.

The instruction area 296 displays data based on the expert instruction data 196. For example, the instruction area 296 may include instructions to the expert user 116 indicating that the expert user 116 should try to determine what the scenario is (i.e. a person that fell while ice skating) and to determine the location of the event that is the subject of the simulated emergency call. The instruction area 296 may also include guidance for using the expert interface 280, that instructs the expert user 116 to record certain information (i.e. an emergency recording panel) provided by the non-expert user 108, such as location information, emergency description, phone number, caller name, and other information. The expert interface 280 further includes buttons 304 for the expert user 116 to dispatch emergency records to the medical, fire, or police department, which is a common practice in real emergencies. At the end of the simulated emergency call, the expert user 116 clicks on a button 308 to terminate the simulated emergency call, such as when the non-expert user 108 reports that first responders have arrived at the emergency locations, as indicated by the scenario data 156 to the non-expert user 108.

In one embodiment, the instruction area 296 includes a timer 312 that counts down from a predetermined time period, such as five minutes. As described below, the timer 312 elicits a sense of urgency and anxiety in the expert user 116 when generating the expert dialogue data 200, because the expert user 116 knows that the simulated emergency call will be terminated at the expiration of the timer 312 whether or not an acceptable resolution to the simulated emergency has been determined. The expert dialogue data 200 is based on the caller dialogue data 168, the expert instruction data 196, and the expert location data 192.

The expert interface 280, in one embodiment, does not display the scenario data 156, the caller emotion data 160, and the caller location data 164. That is, the expert interface 280 of the expert computer system 112 typically does not include any type of scenario data, because it is up to the expert user 116 to determine the details of the event from the caller dialogue data 168 during the simulated emergency call.

Figure 4:
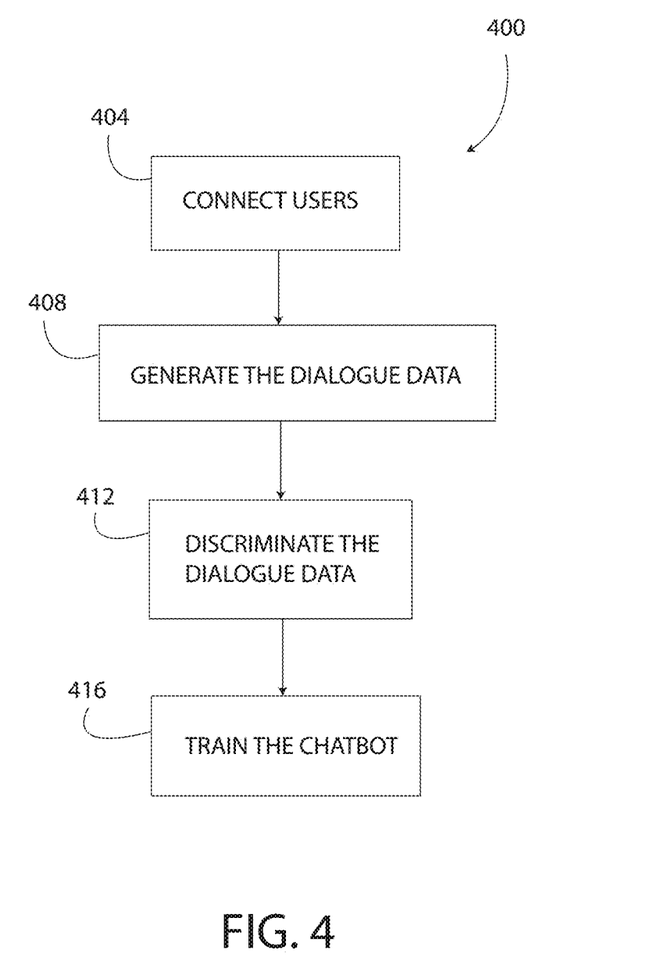
FIG. 4 is a flowchart depicting an exemplary method of operating the crowdsourced dialogue system of FIG. 1.

As shown in FIG. 4, the crowdsourced dialogue system 100 is operable to generate the caller dialogue data 168 and the expert dialogue data 200 during a plurality of simulated emergency calls, and further to train the chatbot 128 of the automated emergency response system 120 with at least the crowdsourced domain-specific dialogue database 236 according to a method 400. In block 404, the method 400 includes establishing the simulated emergency call between the non-expert user 108 and the expert user 116 by "connecting" the users 108, 116 via the Internet 132. At least one of a text-based connection and a voice-based connection (full duplex) are established between the users 108, 116 during the simulated emergency call. In one embodiment, the non-expert user 108 and the expert user 116 are remotely located and communicate with each other via the Internet 132 through a crowdsource configuration.

Crowdsourcing is an optimal way of generating the dialogues 168, 200, and platforms such as Amazon Mechanical Turk and Crowdflower offer convenient access to many participants who might have daily experience with a specific dialogue domain. These participants are typically used as the non-expert users 108. Whereas, in the emergency services example, the expert users 116 are typically 911 dispatchers or other people having the proper training to ask pertinent questions during an emergency situation. In developing the domain-specific dialogue database 236, the simulated emergency call is between a non-expert user 108 and an expert user 116 because domain-specific private dialogues not only include natural interactions between the involved parties, but also have domain-specific requirements. In emergency calls, dispatchers, simulated by the expert users 116, know what questions to ask and how to handle emergencies.

In block 408, when the simulated emergency call is established the non-expert user 108 views and uses the interface 240 and the expert user 116 views and uses the interface 280. Then, the users 108, 116 communicate with each according to the scenario of the scenario data 156 and, in doing so, generate the caller dialogue data 168 and the expert dialogue data 200. Typically, the non-expert user 108 is in simulated distress and requires the "help" of the expert user 116. The caller dialogue data 168 and the expert dialogue data 200 are transmitted to the training system 124 via the Internet 132 and are saved as the crowdsourced domain-specific dialogue database 236.

The user interfaces 240, 280 are configured to elicit at least a sense of realism, urgency, and anxiety from the users 108, 116 engaged in the simulated emergency call. In a real phone call to emergency services, both the caller and dispatcher are anxious. For example, callers want to get help as soon as possible, and dispatchers are trying to figure out the situation as soon as possible. The heightened anxiety levels of the caller and the dispatcher tend to affect the pattern of the dialogue used during the phone call. Specifically, callers often speak quickly and incoherently, and dispatchers often try to manage the caller's emotions to calm them down. Research shows that the higher level of immersion, the stronger sense of presence it creates. It is likely that the integrated effects from all features of the interfaces 240, 280 increased the user's 108, 116 acting skill, thereby improving the accuracy and reliability of the domain-specific dialogue database 236. Typically, the more immersion features, the better the system 100 performs. However, there is a trade-off between simulating realism and the cost of the system 100.

The system 100 elicits these unique domain-specific characteristics from the users 108, 116. For example, realism is evoked or elicited by using the timers 268, 312 to provoke urgency, embedding the street-side image 264 and the map 300 to create presence and enhance the sense-making process, designing close-to-real interfaces, and hiring the expert users 116 with domain knowledge. Location realism optimizes the system 100 in at least two ways. First, a significant part of handling emergency calls is figuring out the caller's location. This is because the caller might not know where they are, or might be too panicked to say it clearly. Second, to immerse the users 108, 116 in the given emergency scenario, the system 100 simulates the physical environment with the street-side image 264 and the map 300. In one embodiment, Google Maps is used to create the different levels of location presence for the non-expert users and the expert users. For example, the street-side image 264 is a Google Maps Street View image and the map 300 is a Google Maps aerial map image of a city map. The non-expert users 108 attempt to orientate themselves using the street-side image 264 to figure out where they are and to provide some landmark information to the expert users 116. The two different views 264, 300 not only create a location simulation that is similar to a real emergency, they also initiate a sense-making process. For example, the non-expert user 108 knows he/she is near 2nd avenue in Manhattan, New York City and describes his/her location to the expert user 116. The expert user 116 knows the emergency happens in New York City but needs to localize the exact position of the non-expert user 108 by asking questions like, "Are there any significant landmarks around you?"

The system 100 elicits a sense of urgency from the users 108, 116 by including the timers 268, 312. The timer 268 in the user interface 240 of the non-expert user 108 counts down from the predetermined time period. To increase anxiety and urgency, the non-expert user 108 may be informed that the simulated emergency call will be a "failure," unless certain goals are met within the predetermined time period. When combined with the emotion data 160, pressure is placed in the non-expert user 108 to act quickly just like in a real emergency situation. For example, the non-expert user 108 may be informed that the injured party at the ice skating rink will perish unless help arrives in five minutes. Similarly, the timer 312 is embedded in the user interface 280 of the expert user 116. In an example, the expert user 116 must figure out the situation within the predetermined time period of the timer 312 or else the simulated emergency call is considered a "failure." The timers 268, 312 and the emotion data 160 cause the dialogue used by the non-expert user 108 and the expert user 116 to closely match the dialogue used by real parties in real emergency situations.

The following example is a user study conducted using the system 100. Twenty-two short scenario descriptions were prepared and saved as the scenario data 156. In this example, nineteen of the scenarios were fabricated and three of the scenarios were summarized from real 911 calls. The reason for using this combination of scenarios is to enable a comparison of the simulated dialogues with the three real dialogues from the real 911 calls.

The scenarios cover a variety of emergencies such as traffic accidents, getting lost, and a fire emergency. Each scenario description contains four elements: basic emergency information, extra details (whether the users 108, 116 need to improvise by themselves), location information (whether the non-expert user 108 knows the location or not in the emergency) and emotional state (anxious, worried, or nervous). Scenario descriptions (i.e. the scenario data 156) are short and simple to leave room for the users 108, 116 to improvise.

In this example, sixty-eight simulated emergency calls (i.e. dialogues) were conducted for the twenty-two scenarios using the system 100. The caller dialogue data 168 and the expert dialogue data 200 from the sixty-eight calls were saved as the crowdsourced domain-specific dialogue database 236. Most of the simulated emergency calls contained three stages: basic information collection (collecting emergency information and information about callers), pre-arrival instruction (such as medical assistance) and checking the arrival of help. The following is an example of caller dialogue data 168 and expert dialogue data 200 generated using the system 100 during the simulated emergency call. The non-expert user 108 is referred to as the "caller," and the expert user 116 is referred to as the "dispatcher." First, is the basic information collection stage: Caller: Help, my son just fell down and isn't responding! Dispatcher: Give me the address, please. Caller: 2252 Midtown Square. Pittsburgh. Dispatcher: and your phone number? Caller: 555 690-5555. Dispatcher: How old is he? Caller: Eight. I just came in and he's on the floor. I think he fell. Next, is the pre-arrival instructions stage: Dispatcher: You need to check regularly his breathing. You need to stay calm. I will help until the paramedics arrive. Caller: I'm worried he's going to die! Dispatcher: Unlock the door and secure the pets, please. Caller: OK, so what do I do? The door is already open. No pets here. Dispatcher: Ok . . . so you don't move him. Next is the checking for the arrival of help stage: Dispatcher: According to my GPS, the ambulance should be there. Caller: It's not here. Dispatcher: Give me your address once again, please. Caller: 2252 Midtown Square. Pittsburgh. Dispatcher: That's what we have. And your door is unlocked? They are supposed to be there. They are saying they are.

The above-described exemplary dialogue data 168, 200 was generated with the system 100 and is not a transcript of a real emergency call. The dialogue data 168, 200 is authentic sounding and has a real sense of urgency and naturalness. The above dialogue 168, 200 is saved as the caller dialogue data 168 and the expert dialogue data 200 and is part of the crowdsourced domain-specific dialogue database 236 for training the chatbot 128.

Figure 5:
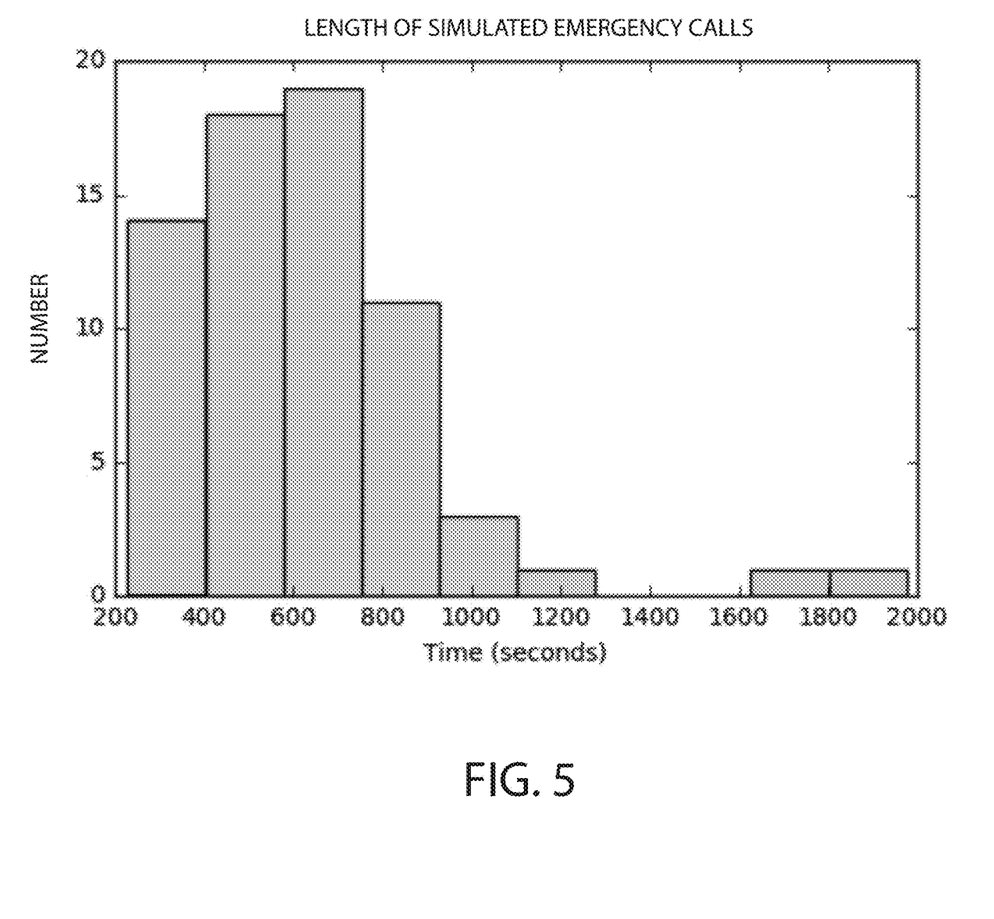
FIG. 5 is a graph showing a distribution of the length of simulated emergency calls associated with the crowdsourced dialogue system of FIG. 1.
Figure 6:
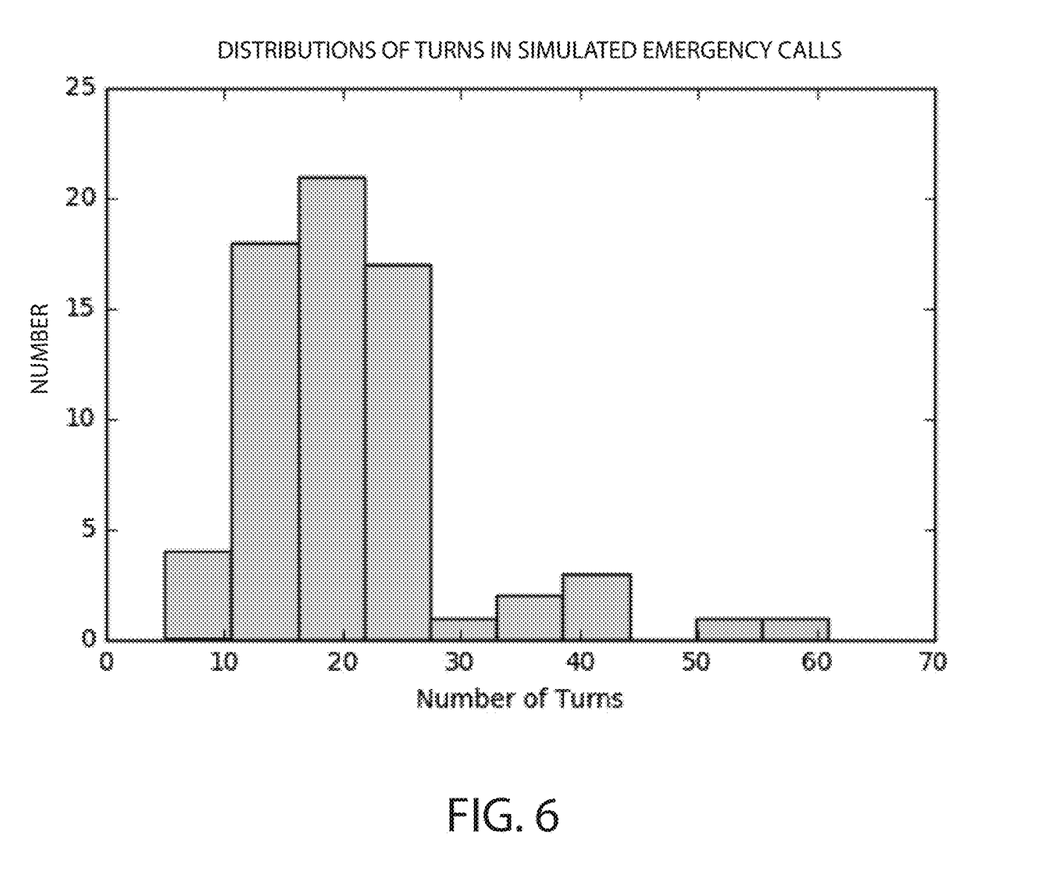
FIG. 6 is a graph showing a distribution of the number of turns taken by participants in simulated emergency calls associated with the crowdsourced dialogue system of FIG. 1.

Participants 108, 116 in the above-described sixty-eight simulated emergency calls spent 636.9 seconds on average during each call (median=605.9, SD=292.9). Each simulated emergency call contains 20.9 turns on average (median=19, SD=9.50). The distribution of call duration and number of turns are shown in FIG. 5 and FIG. 6. Specifically, FIG. 5 is a graph of the distribution of the length of the simulated emergency calls, and FIG. 6 is a graph of the distribution of the number of turns of the simulated emergency calls. One "turn" consists of each of the users 108, 116 keying data into the corresponding input text box 244, 284.

To test the system 100 as generating useful domain-specific dialogue, the caller dialogue data 168 and the expert dialogue data 200 were analyzed and examined user LIWC scores (Linguistic Inquiry and Word Count). First, the dialogue data 168, 200 was examined for showing urgency-related emotions. LIWC scores are widely used to evaluate psychological emotions within texts. LIWC scores contain fifty-eight psychological indicators, which contain a variety of emotions. Exemplary indicators include insecure (the degree to which a person lacks confidence when dealing with others), anxious (the degree to which a person is experiencing anxiety and how strongly affected they are by it), family-oriented (the degree to which a person's values and behaviors are rooted in their sense of family), sociable (how much a person seeks out and enjoys social situations), self-conscious (how likely a person is to feel embarrassed or anxious about themselves or their skills), stressed (the degree to which a person is experiencing stress and how strongly affected they are by it), neuroticism (the degree to which a person expresses strong negative emotions), body focus (the degree to which a person focuses attention on their body or other people's bodies), and depression (the degree to which a person may have difficulty finding joy in their life). In this analysis, the indicators most closely related to the feeling of "urgency" were used, including as anxiety and stress.

The users 108, 116 utterances were extracted from the dialogue data 168, 200 and the LIWC scores were calculated for these texts. The indicator scores (out of 100) for the caller dialogue data 168 and the expert dialogue data 200 are as follows: insecure 93.3, anxious 86.6, family-oriented 85.9, sociable 81.1, self-conscious 78.7, stressed 77.5, neuroticism 76.3, body focus 74.3, and depression 74.1. The LIWC scores indicate that users 108, 116 felt stressed, anxious, and self-conscious, which is highly related to the sense of urgency. Users 108, 116 also felt insecure and neurotic during the simulated emergency call, since emergencies usually contain events with negative results such as an illness or loss of property. Moreover, the LIWC scores indicate that the users 108, 116 focused on body, family, and social relations in the simulated emergency calls. Such LIWC scores and content frequently appear in real emergency calls when callers describe their own and family members' situations.

Based on the above, the system 100 is an effective generator of dialogue data 168, 200 for the crowdsourced domain-specific dialogue database 236; as is apparent because the simulated dialogues (i.e. the caller dialogue data 168 and the expert dialogue data 200) have similar styles (based at least one the LIWC scores) to the dialogue of real emergencies.

Figure 7:
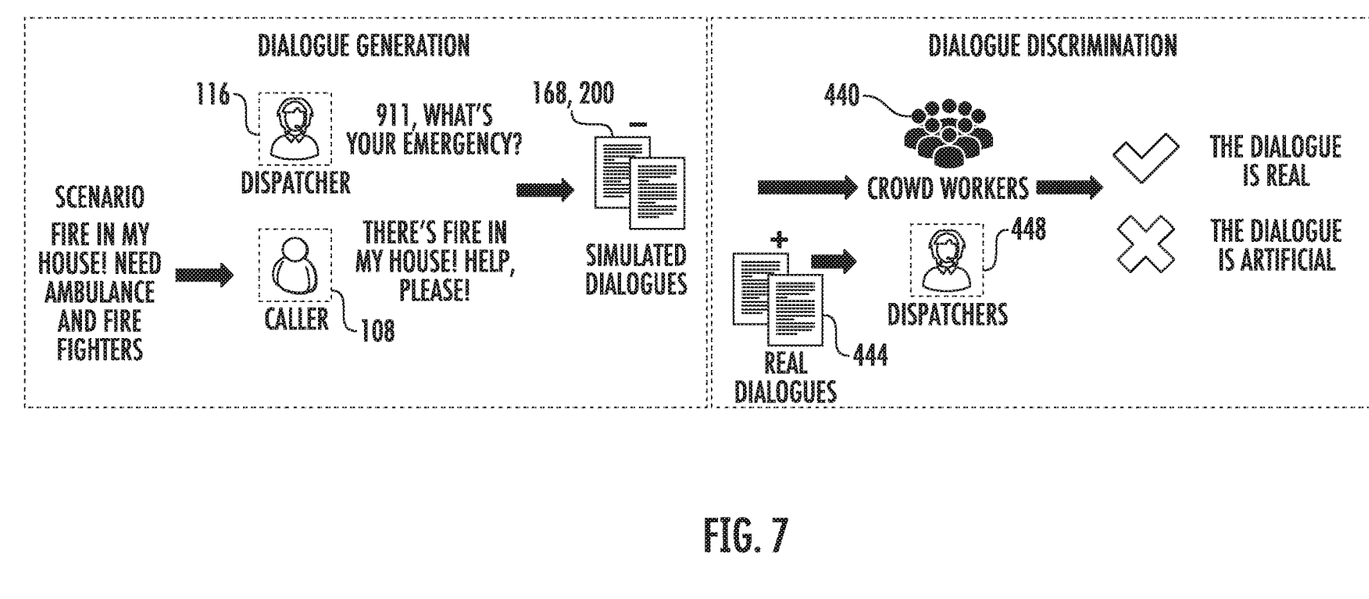
FIG. 7 is a diagram depicting a process of generating dialogue with the crowdsourced dialogue system of FIG. 1 and discriminating the generated dialogue to identify generated dialogue that appears to be real and generated dialogue that appears to be artificial.

Next, as shown in block 412 of FIG. 4 and with additional reference to FIG. 7, the method 400 includes discriminating the caller dialogue data 168 and the expert dialogue data 200 into at least two categories including "real dialogue" and "artificial dialogue." To accomplish the discrimination, the system 100 draws on literature from GAN (Generative Adversarial Networks). GAN is a framework used to train deep neural networks. In the GAN framework, two agents, a generator and a discriminator, are created in order to generate high-quality data. The generator is responsible for generating data according to the latent space of real data and adding some noise to the generated artificial samples. The task for generators is to create samples as close to reality as possible and to fool the discriminators.

The discrimination employed in the method 400 is based on by the GAN framework. Specifically, the non-expert users 108 are told that the caller dialogue data 168 that they generate will be evaluated by other users 440 (FIG. 7) regarding the authenticity of the dialogue. If the data 168 generated by the non-expert users 108 are evaluated as being "real dialogue," then the non-expert user 108 receives a benefit, such a monetary payment. This approach incentivizes the non-expert users 108 to generate high-quality caller dialogue data 168.

As shown in FIG. 7, the caller dialogue data 168 and the expert dialogue data 200 (labeled as simulated dialogues) are combined with real dialogue data 444 from actual emergency calls. Then, the crowdworkers 440, sometimes including actual 911 dispatchers 448, who did not participate in the generation of the dialogues 168, 200, 444 and do not know which dialogues 168, 200, 444 are simulated and which dialogues are real are recruited to evaluate the dialogues 168, 200, 444. The crowdworkers 440, 448 identify each dialogue 168, 200, 444 as being either "real" or "artificial." The dialogues 168, 220 that regularly determined to be "artificial," based on a scoring system, are not added to the crowdsourced domain-specific dialogue database 236. The dialogues 168, 200 that are regularly determined to be "real," based on the scoring system, are added to the crowdsourced domain-specific dialogue database 236. The discrimination step of block 412 is a further measure to ensure that the crowdsourced domain-specific dialogue database 236 is built with the best quality data available.

The system 100 solves a data scarcity problem with regard to building a database of domain-specific dialogue when that domain is protected by privacy rules and/or is otherwise inaccessible. The system 100 generates dialogue 168, 200 that is sufficiently similar to/the same as real emergency dialogue without requiring the privacy of real people to be compromised. Thus, the system 100 overcomes a bottleneck in developing intelligent chatbots that can assist more advanced tasks, and is an improvement to computer functionality.

Next, with reference to block 416 of FIG. 4, the method 400 includes training the chatbot 128. The chatbot 128 is trained according to a deep learning model for neural networks using the crowdsourced domain-specific dialogue database 236 and the general domain dialogue database 232. Thus, the chatbot 128 attains the ability to generate natural language dialogue data 216 corresponding to the specific domain of the crowdsourced domain-specific dialogue database 236 as well as to generate dialogue data 216 corresponding to the general domain of normal conversations from the general domain dialogue database 232. Since the process of obtaining the domain-specific dialogue database 236 ensures that the database 236 includes authentic-sounding dialogue, the trained chatbot 128 is able to generate accurate, coherent, and realistic sounding dialogue data 216 in response to text-based inputs, for example.

Figure 8:
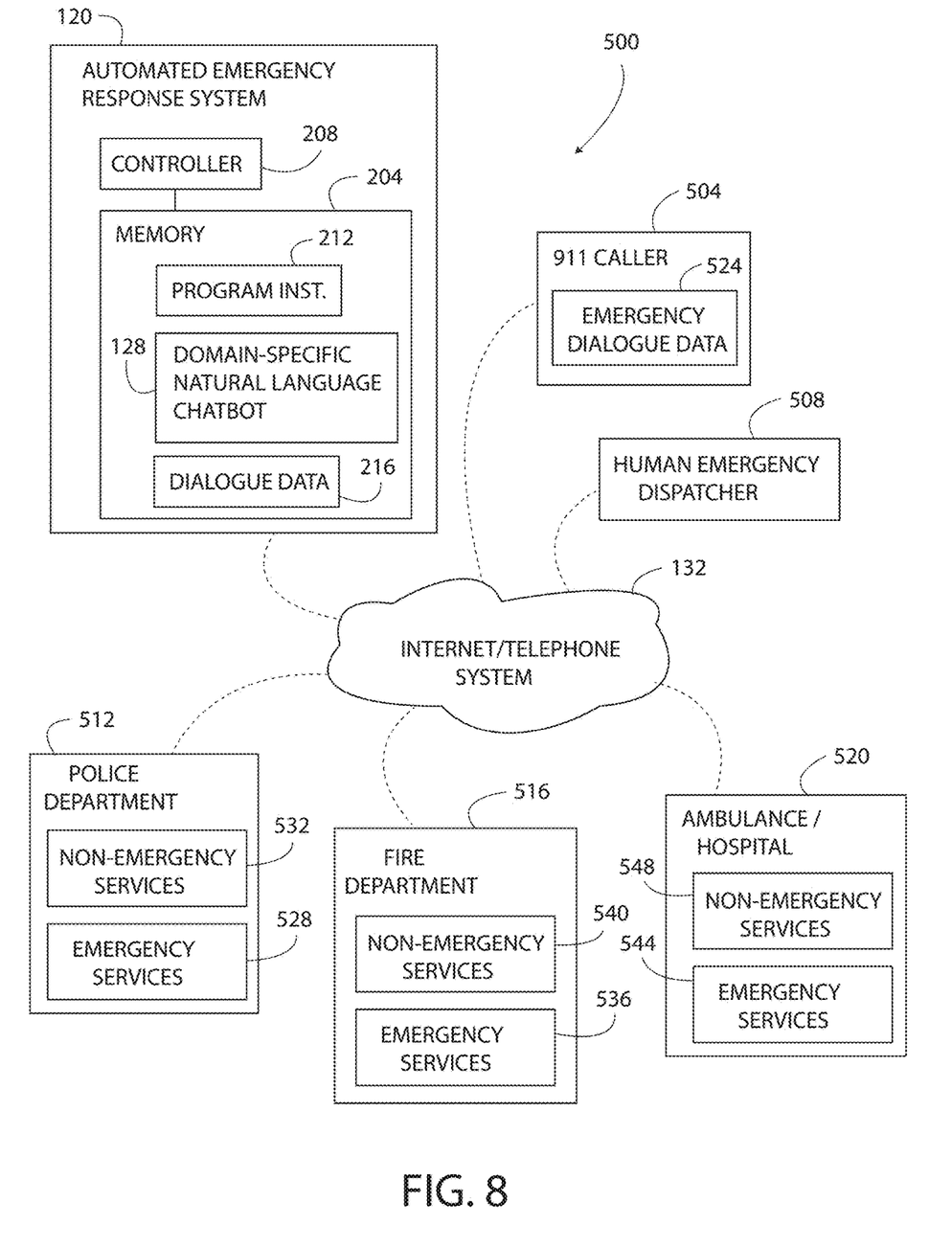
FIG. 8 is a block diagram showing the automated emergency response system of FIG. 1 in a real emergency environment.

As shown in FIG. 8, the automated emergency response system 120 including the chatbot 128 is operated in a real emergency environment 500 that includes an actual emergency caller 504, a human emergency dispatcher 508, a police department 512, a fire department 516, and a hospital 520. For example, the emergency caller 504 is in an emergency situation and uses a telephone or a computer to contact the automated emergency response system 120 via the Internet 132 and/or a telephone system. In this example, the emergency caller 504 uses a smartphone to contact the automated emergency response system 120 via a text message. Specifically, the emergency caller 504 generates emergency dialogue data 524 (also referred to herein as emergency data) that is transmitted to the automated emergency response system 120 via the Internet 132. The emergency dialogue data 524 are processed by the chatbot 128 and a natural language response is generated and stored as the dialogue data 216. Next, the dialogue data 216 is transmitted via text message back to the emergency caller 504. This process is repeated until the chatbot 128 has determined an appropriate course of action to respond to the emergency described by the emergency caller 504. For example, the automated emergency response system 120 may determine that the emergency services of the hospital 520 should be immediately dispatched to the location of the emergency caller 504 to provide emergency services to the emergency caller 504 based at least in part on the emergency dialogue data 524.

The automated emergency response system 120 reduces the number of human emergency dispatchers 508 that are required to operate an emergency services center by automating the dispatch of certain services. Moreover, the automated emergency response system 120 including the chatbot 128 is configured to send an appropriate level of assistance to the emergency caller 504. In this example, the police department 512 includes emergency 528 and non-emergency services 532, the fire department 516 includes emergency 536 and non-emergency services 540, and the hospital 520 includes emergency 544 and non-emergency services 548. The automated emergency response system 120 is configured to dispatch to the emergency caller 504 only the appropriate level of services, so as to conserve human resources and to increase the efficiency of the emergency services center.

The automated emergency response system 520 is further configured to identify bogus callers or callers without a real need for emergency services. The chatbot 128, which is trained with the crowdsourced domain-specific dialogue database 236 and the general domain dialogue database 232, is programmed to detect real emergencies and the urgency and tone of the corresponding text-based communications from the emergency data 524. The chatbot 128 can, therefore, identify text-based communication that is non-genuine and prevent emergency resources from being wasted on non-genuine callers.

Although the automated emergency response system 120 is configured to respond appropriately to most emergency callers, there may be situations in which the chatbot 128 cannot generate appropriate dialogue data 216 for communicating with the emergency caller 504. In such a situation, the automated emergency response system 120 transfers the emergency call to the human emergency dispatcher 508 for manual processing.

In the examples set forth above, the automated emergency response system 120 is used in the domain of emergency services. In other embodiments, the chatbot 128 is used to generate the dialogue data in other domains such as real estate, finance, and legal systems. The realism features can be modified to fit a specific domain's scenarios. The framework of dialogue collection and discrimination and the collaboration model between an expert-crowd and an unskilled crowd can be directly applied to other domains. Thus, the response system 120 and the chatbot 128 are not to be limited to the emergency services domain. Moreover, the system 100 and method 400 of generating the crowdsourced domain-specific dialogue database 236 are not to be limited to the emergency services domain.

While the disclosure has been illustrated and described in detail in the drawings and foregoing description, the same should be considered as illustrative and not restrictive in character. It is understood that only the preferred embodiments have been presented and that all changes, modifications, and further applications that come within the spirit of the disclosure are desired to be protected.

What is claimed is:

1. A crowdsourced dialogue system, comprising:
   a first computer system communicatively connected to the Internet and including a caller interface configured to be operated by a non-expert user during a simulated call of a plurality simulated calls and to generate caller dialogue data based on inputs to the first computer system from the non-expert user;
   a second computer system communicatively connected to the Internet and including an expert interface configured to be operated by an expert user during the simulated call and to generate expert dialogue data based on inputs to the second computer system from the expert user;
   a training system communicatively connected to the Internet and including a general domain dialogue database, the training system configured to generate a domain-specific dialogue database based on the caller dialogue data and the expert dialogue data generated from the plurality of simulated calls; and
   an automated response system communicatively connected to the Internet and including a chatbot that is trained with the general domain dialogue database and the domain-specific dialogue database to generate natural language dialogue data at least in a domain of the domain-specific dialogue database during a real call,
   wherein the caller interface includes a timer that counts down from a predetermined time period to impart a sense of urgency and/or anxiety to the non-expert user during the simulated call, and
   wherein the simulated call is terminated at an expiration of the predetermined time period.

2. The crowdsourced dialogue system of claim 1, wherein:
   the caller interface is configured to display scenario data to the non-expert user during the simulated call,
   the caller interface is configured to display caller emotion data to the non-expert user during the simulated call,
   the caller interface is configured to display caller location data to the non-expert user corresponding to a specific geographical location during the simulated call, and
   the caller dialogue data are based on the expert dialogue data, the scenario data, the emotion data, and the caller location data.

3. The crowdsourced dialogue system of claim 2, wherein:
   the caller location data includes a street-side image of the specific geographical location, and
   the caller is located somewhere other than the specific geographical location during the simulated call.

4. The crowdsourced dialogue system of claim 2, wherein the scenario data describes a scenario in the domain of the domain-specific dialogue database.

5. The crowdsourced dialogue system of claim 1, wherein:
   the domain includes providing emergency services during an emergency,
   the simulated call is a simulated emergency call pertaining to a simulated emergency situation, and
   the real call is an actual emergency call pertaining to a real emergency situation.

6. The crowdsourced dialogue system of claim 2, wherein:
   the expert interface is configured to display expert instruction data to the expert user during the simulated call,
   the expert interface is configured to display expert location data to the expert user corresponding to a general geographical location of the caller that is broader than the specific geographical location of the caller during the simulated call, and
   the expert dialogue data are based on the caller dialogue data, the expert instruction data, and the expert location data.

7. The crowdsourced dialogue system of claim 6, wherein the expert interface does not display the scenario data, the caller emotion data, and the caller location data during the simulated call.

8. The crowdsourced dialogue system of claim 1, wherein the expert user is an emergency services dispatcher.

9. A method of training and operating an automated emergency response system to dispatch emergency services, comprising:
   connecting a non-expert user of a caller interface to an expert user of an expert interface to conduct a simulated emergency call of a plurality of simulated emergency calls;
   receiving caller dialogue data based on dialogue from the non-expert user of the caller interface during the simulated emergency call;
   receiving expert dialogue data based on dialogue from the expert user of the expert interface during the simulated emergency call;
   imparting a sense of urgency and/or anxiety to the non-expert user by displaying a timer that counts down from a predetermined time period on the caller interface;
   terminating the simulated emergency call between the non-expert user and the expert user at an expiration of the predetermined time period;
   generating a domain-specific dialogue database based on the caller dialogue data and the expert dialogue data;
   training a domain-specific natural language chatbot of the automated emergency response system with the domain-specific dialogue database;
   operating the domain-specific natural language chatbot to elicit emergency data from a user of the automated emergency response system during a real emergency call; and dispatching emergency services to the user of the automated emergency response system based on the elicited emergency data.

10. The method of claim 9, further comprising:

displaying scenario data, caller emotion data, and caller location data to the non-expert user of the caller interface during the simulated emergency call, wherein the caller dialogue data is based on the expert dialogue data, the scenario data, the emotion data, and the caller location data, and wherein the caller location data corresponds to a specific geographical location.

11. The method of claim 10, further comprising:

displaying an image of a street-side location as the caller location data, and wherein the caller is located somewhere other than the specific geographical location during the simulated emergency call.

12. The method of claim 10, further comprising:

displaying expert instruction data and expert location data to the expert user of the expert interface during the simulated emergency call, wherein the expert dialogue data is based on the caller dialogue data, the expert instruction data, and the expert location data, and wherein the expert location data corresponds to a general geographical location.

13. The method of claim 12, further comprising:

displaying an image of a portion of map as the expert location data.

* * * * *